(12) United States Patent
Zhou et al.

(10) Patent No.: US 8,559,569 B1
(45) Date of Patent: Oct. 15, 2013

(54) PREAMBLE DETECTION BASED ON REPEATED PREAMBLE CODES

(75) Inventors: Quan Zhou, Sunnyvale, CA (US); Songping Wu, Cupertino, CA (US); Daxiao Yu, Cupertino, CA (US)

(73) Assignee: Marvell International Ltd. (BM)

( * ) Notice: Subject to any disclaimer, the term of this patent is extended or adjusted under 35 U.S.C. 154(b) by 77 days.

(21) Appl. No.: 13/358,584

(22) Filed: Jan. 26, 2012

Related U.S. Application Data

(60) Provisional application No. 61/437,523, filed on Jan. 28, 2011.

(51) Int. Cl.
*H03D 1/00* (2006.01)

(52) U.S. Cl.
USPC ........... 375/343; 375/316; 375/344; 375/340; 375/342; 375/354; 375/355; 375/362; 375/364; 375/365; 375/368

(58) Field of Classification Search
USPC ......... 375/316, 344, 343, 340, 342, 354, 355, 375/362, 364, 365, 368
See application file for complete search history.

(56) References Cited

U.S. PATENT DOCUMENTS

| | | | |
|---|---|---|---|
| 7,058,151 B1 * | 6/2006 | Kim ............................... | 375/355 |
| 7,474,610 B2 * | 1/2009 | Yoshida et al. ................ | 370/204 |
| 2003/0012297 A1 * | 1/2003 | Imamura ........................ | 375/295 |
| 2006/0126670 A1 * | 6/2006 | Jeon et al. ...................... | 370/503 |
| 2010/0091742 A1 * | 4/2010 | Lee et al. ....................... | 370/336 |

* cited by examiner

*Primary Examiner* — Siu Lee

(57) ABSTRACT

Systems, methods, and other embodiments associated with preamble detection based on repeated preamble codes are described. According to one embodiment, an apparatus is provided that wirelessly receives a signal and calculates a differential output corresponding to a multiplication of the signal and a delayed version of the signal. A cross correlation is performed between the differential output and a known preamble pattern to produce a cross correlation output. A moving average calculation is performed on the cross correlation output to produce an average cross correlation. One or more peaks are detected in the average cross correlation when the average cross correlation has an amplitude greater than a threshold. When the one or more detected peaks meets predetermined criteria, the apparatus provides information about at least one of the detected peaks for subsequent signal processing.

20 Claims, 6 Drawing Sheets

PREAMBLE DETECTION BASED ON REPEATED PREAMBLE CODES

CROSS REFERENCE TO RELATED APPLICATIONS

This patent disclosure claims the benefit of U.S. Provisional Application No. 61/437,523 filed on Jan. 28, 2011, which is hereby wholly incorporated by reference.

BACKGROUND

The background description provided herein is for the purpose of generally presenting the context of the disclosure. Work of the presently named inventor(s), to the extent the work is described in this background section, as well as aspects of the description that may not otherwise qualify as prior art at the time of filing, are neither expressly nor impliedly admitted as prior art against the present disclosure.

Many wireless communication protocols (e.g., WiFi, Zigbee) include known preamble codes at the beginning of each packet. Preamble codes are typically used by a receiver to detect packets, and also to make adjustments to the receiver for the processing of packets. For example, preamble codes may be used to determine a carrier frequency offset (CFO) with respect to an oscillator frequency of the receiver. The CFO is then compensated for in subsequent processing of the packets transmitted by a same transmitter to the receiver to better detect the data contained within the received signal.

SUMMARY

In one embodiment an apparatus includes a differential computation logic, a preamble matching logic, a cross correlation averaging logic, and a peak detection logic. The differential computation logic is configured to calculate a differential output corresponding to a multiplication of samples of a wirelessly received signal and a delayed version of the samples.

The preamble matching logic is configured to perform a cross correlation between the differential output and a known preamble pattern to produce a cross correlation output. The cross correlation averaging logic is configured to perform a moving average calculation on the cross correlation output to produce an average cross correlation. The peak detection logic is configured to detect one or more peaks in the average cross correlation. A peak is detected when the average cross correlation has an amplitude greater than a threshold. Information about at least one of the detected peaks is provided for subsequent processing when the one or more detected peaks meets predetermined criteria.

In another embodiment, a method includes wirelessly receiving a signal and calculating a differential output corresponding to a multiplication of the signal and a delayed version of the signal. The method also includes performing a cross correlation between the differential output and a known preamble pattern to produce a cross correlation output. A moving average calculation is performed on the cross correlation output to produce an average cross correlation. One or more peaks are detected in the average cross correlation when the average cross correlation has an amplitude greater than a threshold. When the one or more detected peaks meets predetermined criteria, the method includes providing information about at least one of the detected peaks for subsequent signal processing.

In another embodiment, a system-on-chip includes a receiver, a preamble detector logic, and a carrier frequency offset calculation logic. The receiver is configured to wirelessly receive a signal. The preamble detector logic is configured to i) calculate a differential output corresponding to a multiplication of the signal and a delayed version of the signal; ii) perform cross correlation between the differential output and a known preamble pattern to produce a cross correlation output; iii) perform a moving average calculation on the cross correlation output to produce an average cross correlation; iv) detect one or more peaks in the average cross correlation, wherein a peak is detected when the average cross correlation has an amplitude greater than a threshold; and v) when the one or more detected peaks meets predetermined criteria, provide peak information describing one or more aspects of the one or more detected peaks. The carrier frequency offset calculation logic is configured to calculate a carrier frequency offset based, at least in part, on the peak information.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one example of the boundaries. One of ordinary skill in the art will appreciate that in some examples one element may be designed as multiple elements or that multiple elements may be designed as one element. In some examples, an element shown as an internal component of another element may be implemented as an external component and vice versa. Furthermore, elements may not be drawn to scale.

DETAILED DESCRIPTION

Described herein are example systems, methods, and other embodiments associated with preamble detection based on repeated preamble codes. The systems, methods, and devices described herein leverage the repetitive nature of short preamble codes in WLAN (and other wirelessly transmitted) packets to provide efficient and accurate preamble detection and analysis. The systems, methods, and devices described herein efficiently determine a time domain position of the preamble codes within a preamble. The time domain position of the preamble codes in the received signal can be compared with an expected time domain position of the preamble codes as specified by the protocol to calculate a carrier frequency offset.

Figure 1:
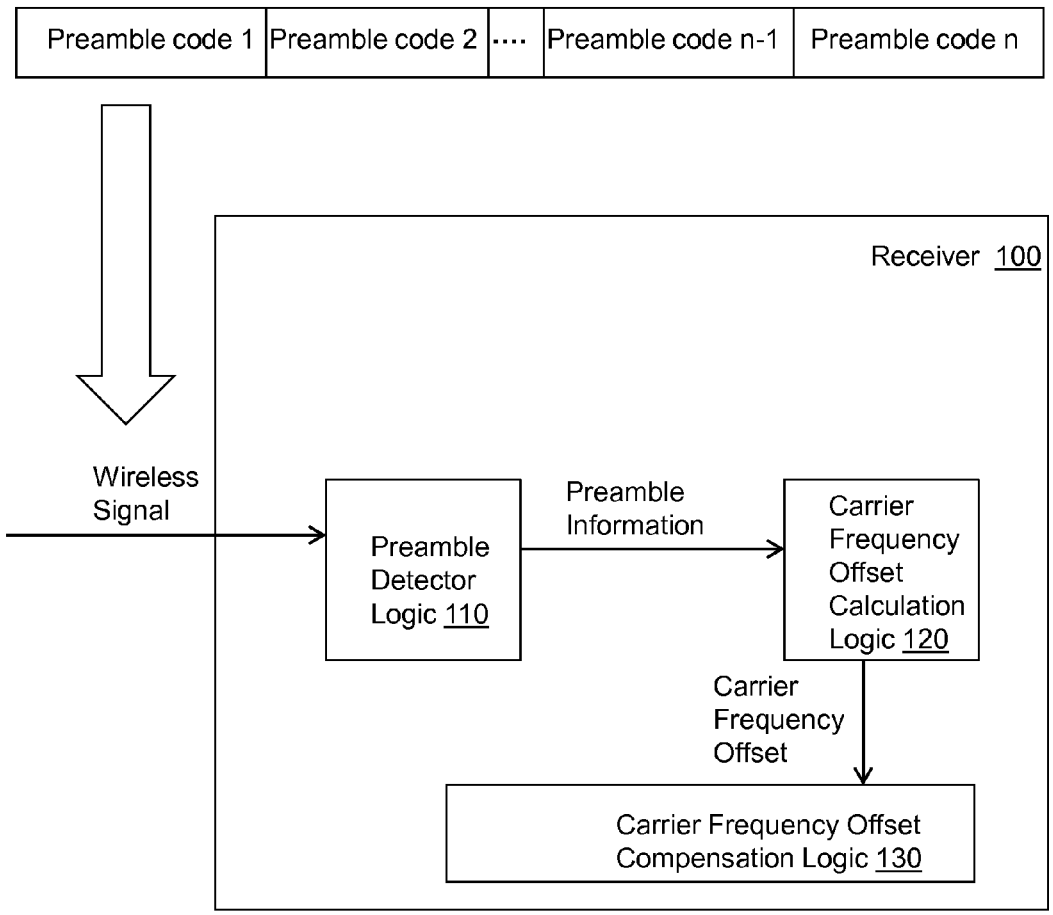
FIG. 1 illustrates one embodiment of an apparatus associated with preamble detection based on repeated preamble codes.

With reference to FIG. 1, one embodiment of a wireless receiver 100 is shown that is associated with preamble detection based on repeated preamble codes. The wireless receiver 100 receives a wireless signal that is used to transmit data packets between a transmitting device (not shown) and the wireless receiver 100. Each data packet (also referred to herein generally as "packet") has a preamble, and the preamble typically includes a number n of repeated short preamble codes followed by a smaller number of long preamble codes (not shown in FIG. 1). At least some of the packets include a sequence of repeated preamble codes that are configured according to a predetermined protocol (e.g., IEEE 802.11a, Zigbee). The preamble codes are used for packet detection, carrier frequency offset estimation, symbol timing, and/or channel estimation. Quickly detecting and precisely identifying the timing of the short preamble codes within incoming packets improves the efficiency with which the wireless receiver 100 can process packets.

The wireless receiver 100 includes a preamble detector logic 110, a carrier frequency offset calculation logic 120, and a carrier frequency offset compensation logic 130. Each of the preamble detector logic 110, the carrier frequency offset calculation logic 120, and the carrier frequency offset compensation logic 130 uses a priori knowledge of the preamble to deduce various transmission characteristics of a particular packet. For example, the carrier frequency offset of a packet may be used to make processing adjustments to better identify the transmitted data contained within the received packet.

The preamble detector logic 110 is configured to detect the preamble and to provide information about the preamble to the carrier frequency offset calculation logic 120. For example, the preamble detector logic 110 can provide information about the timing of the short preamble codes to the carrier frequency offset logic 120. The carrier frequency offset logic 120 uses the timing information to estimate a carrier frequency offset according to any of a number of known techniques. The estimated carrier frequency offset is then provided to the carrier frequency offset compensation logic 130 to adjust the processing of the remainder of the packet.

Figure 2:
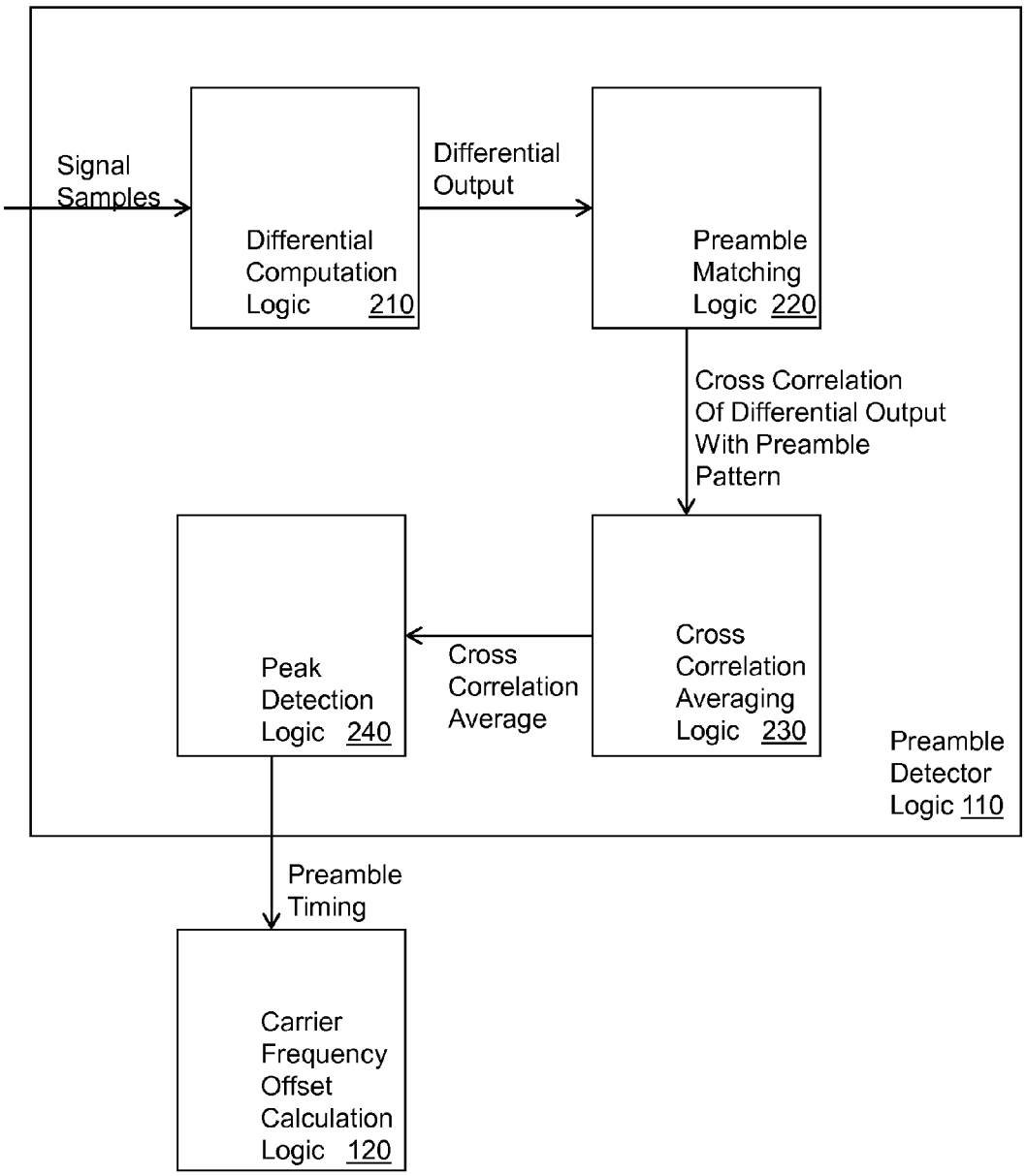
FIG. 2 illustrates one embodiment of an apparatus associated with preamble detection based on repeated preamble codes.

FIG. 2 illustrates one embodiment of the preamble detector logic 110. The preamble detector logic 110 receives samples of the wirelessly received signals and outputs preamble timing information to the carrier frequency offset calculation logic 120. The preamble detector logic 120 includes a differential computation logic 210, described in more detail in FIG. 3, that is configured to calculate a differential output corresponding to a multiplication of the samples and a delayed version of the samples. The preamble detector logic 120 includes a preamble matching logic 220, described in more detail in FIG. 4, that is configured to perform a cross correlation between the differential output and a known preamble pattern to produce a cross correlation output.

Figure 5:
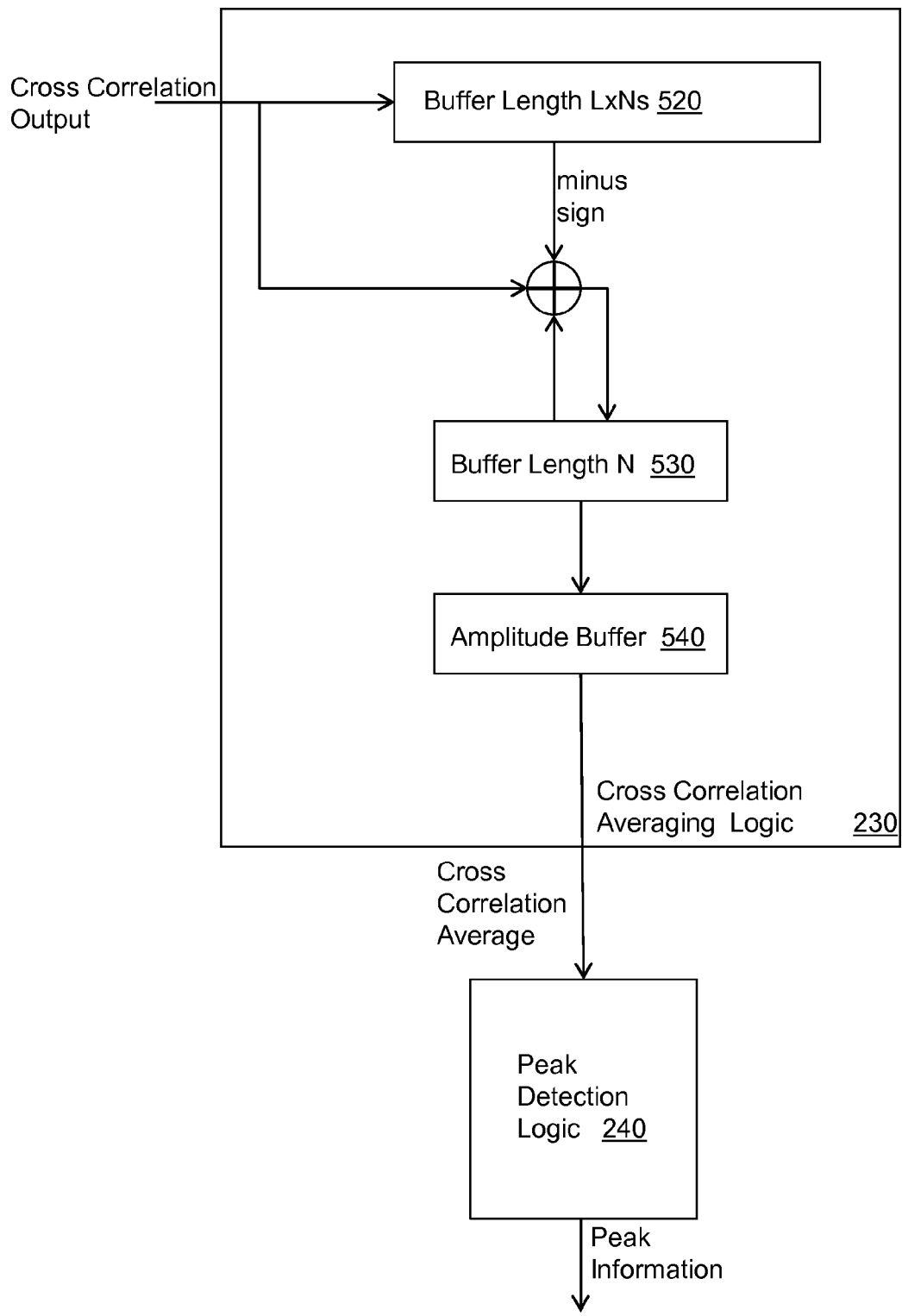
FIG. 5 illustrates one embodiment of an apparatus associated with preamble detection based on repeated preamble codes.

The preamble detector logic 110 includes a cross correlation averaging logic 230, described in more detail in FIG. 5, that is configured to perform a moving average calculation on the cross correlation output to produce an average cross correlation. The preamble detector logic 110 includes peak detection logic 240, described in more detail in FIGS. 5 and 6, that is configured to detect one or more peaks in the average cross correlation. Peaks in the average cross correlation are deemed to correspond to the time domain position of the preamble codes within the packet. When the detected peaks meet peaks meets a predetermined preamble detection criteria, the peak detection logic 240 determines that the preamble has been successfully detected and provides the time domain positions of the preamble codes to the carrier frequency offset calculation logic.

Figure 3:
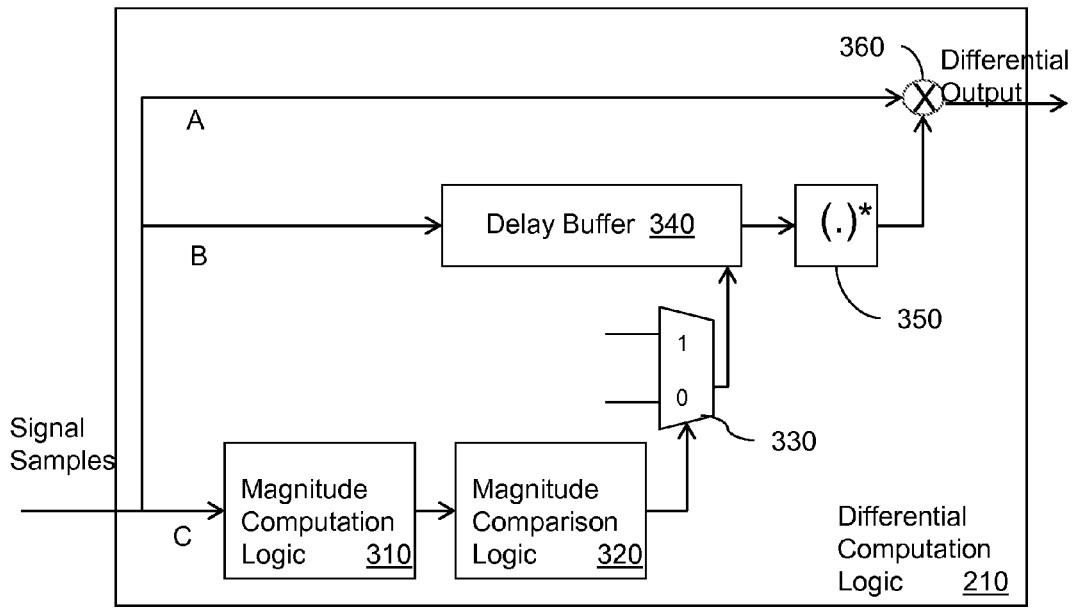
FIG. 3 illustrates one embodiment of an apparatus associated with preamble detection based on repeated preamble codes.

FIG. 3 illustrates one embodiment of the differential computation logic 210. The signal samples are provided to three parallel paths A, B, and C. Un-delayed samples are provided to a cross correlation operation 360 on path A. In path B, the signal samples are input to a delay buffer 340 that stores N samples. Thus the output of the delay buffer 340 is a sample delayed by N time units. The output of the delay buffer 340 is processed by a conjugation operation 350 that inverts the output sample. Thus, the correlation operation 360 is acting on a sample and an inverse of a sample that occurred N time units prior to the sample to provide a differential output. Calculation of the differential output effectively extracts out the common phase caused by the carrier frequency offset (CFO), hence once the timing is determined, the CFO can be derived as a by-product.

The path C is used to selectively reset the delay buffer to all zeroes when no packet is being transmitted. When no packet is being transmitted, the signal samples will represent noise. The cross correlation of noise (on path A) and zero (on path B) will be very low, making it easy to discern the absence of a received signal based on the differential output.

The path C includes a magnitude computation logic 310 that determines a magnitude of the sample. In one embodiment, the magnitude is determined based on the I and Q values of the sample. Because the samples represent a position of a sinusoidal waveform (the received signal) as a vector in a complex plane, the samples have a real component, I, and an imaginary component, Q. The magnitude computation logic 310 determines which of the I value and the Q value has the maximum value and which has the minimum value. To determine the magnitude, the magnitude computation logic 310 adds the maximum value to 3.125 times the minimum value.

A magnitude comparison logic 320 compares the magnitude computed by the magnitude computation logic 310 to a threshold value. If a predetermined number of consecutive magnitude values are greater than the threshold value, it is determined that there is no transmitted signal. The magnitude comparison logic 320 then causes a buffer reset selector 330 to reset the delay buffer 340 to hold all zeroes until the magnitude of the samples falls (i.e., indicates that a transmitted signal is being received).

Figure 4:
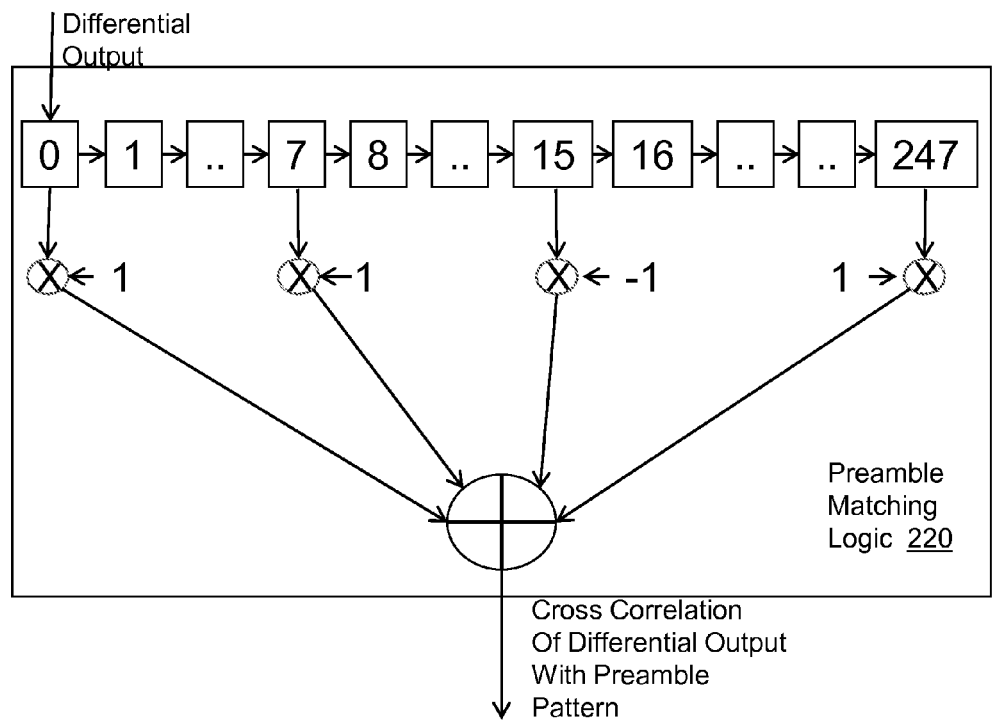
FIG. 4 illustrates one embodiment of an apparatus associated with preamble detection based on repeated preamble codes.

FIG. 4 illustrates one embodiment of the preamble matching logic 220. The preamble matching logic 220 produces a cross correlation output $C_n$, where:

$$C_n = \sum_{i=o}^{Np-1} (x_{n-i} x^*_{n-i-D}) d_i \text{ the cross correlation output and where}$$

$d_i = p_i p^*_{i+D}$ is the complex differential of the preamble pattern.

$x_{n-i} x^*_{n-i-D}$ is the differential output from the preamble detector logic 210.

D is the sample spacing (e.g., delay) in the differential computation. D is a fraction of the length of the whole preamble sequence. The vector d is called the differential preamble pattern, which is represented by the 1's and the −1 being input to the cross correlation operations in FIG. 4. The differential preamble pattern can be precomputed based on the distance D and stored for access by the preamble matching logic 220. In the embodiment shown in FIG. 4, the number of preamble codes is 32 and the number samples for the overall preamble sequence is 256. The 256 differential output samples representing the beginning of a detected signal are shifted through the preamble matching logic 220 as shown by the boxes in FIG. 4. There are 32 cross correlation operations, each of which performs a cross correlation of every eighth sample with the differential preamble pattern. As the samples are shifted through, the preamble matching logic 220 sums the output of the cross correlation operations to produce the cross correlation output, which is input to the cross correlation averaging logic 230 (FIGS. 2 and 5).

FIG. 5 illustrates one embodiment of the cross correlation averaging logic 230. The cross correlation output is input to a first buffer 520 that has a length of L×N, where L is the number of preamble codes used in the averaging operation and N is the number of samples per preamble code (e.g., N=256 in FIG. 4). The cross correlation output is also input to an adding operation that adds the inverse of the output of the first buffer (i.e., subtracts a prior sample $x_{n-8L}$ from the present sample $x_n$). The result of the adding operation ($x_n - x_{n-8L}$) is stored in a second buffer 530 that has a length of 256. An output of the second buffer 530 is fed back to the adding operation (i.e., adds an adding operation result from an immediately prior preamble code). In one embodiment, the cross correlation averaging logic 230 is implemented in Static Random Access Memory (SRAM) using a First In First Out memory access protocol for the buffers. This saves the cost of using registers to implement the buffers and allows for a larger moving window to be used in the moving average calculation.

The result of the adding operation corresponds to a moving average of the correlation output with a moving window of L×N. Using a moving window of more than one preamble code length improves the accuracy with which preamble code timing can be detected. This is because magnitudes of peaks in the average that correspond to the start of each preamble code increase as each preamble code moves through the window. The moving average is stored in an amplitude buffer 540.

The amplitude buffer 540 computes an amplitude of each averaged cross correlation sample as the sum of the squares of the I value and the Q value for each averaged cross correlation sample. When a preamble has been detected, the sequence of amplitudes stored in the amplitude buffer 540 will include a series of peaks separated by approximately the same amount of time as is between preamble codes. This series of peaks is the cross correlation average, which is input to the peak detection logic 240. The peak detection logic 240 evaluates the cross correlation output against a preamble criteria, which specifies various characteristics of the peaks, to determine if an appropriate series of peaks has been detected.

Figure 6:
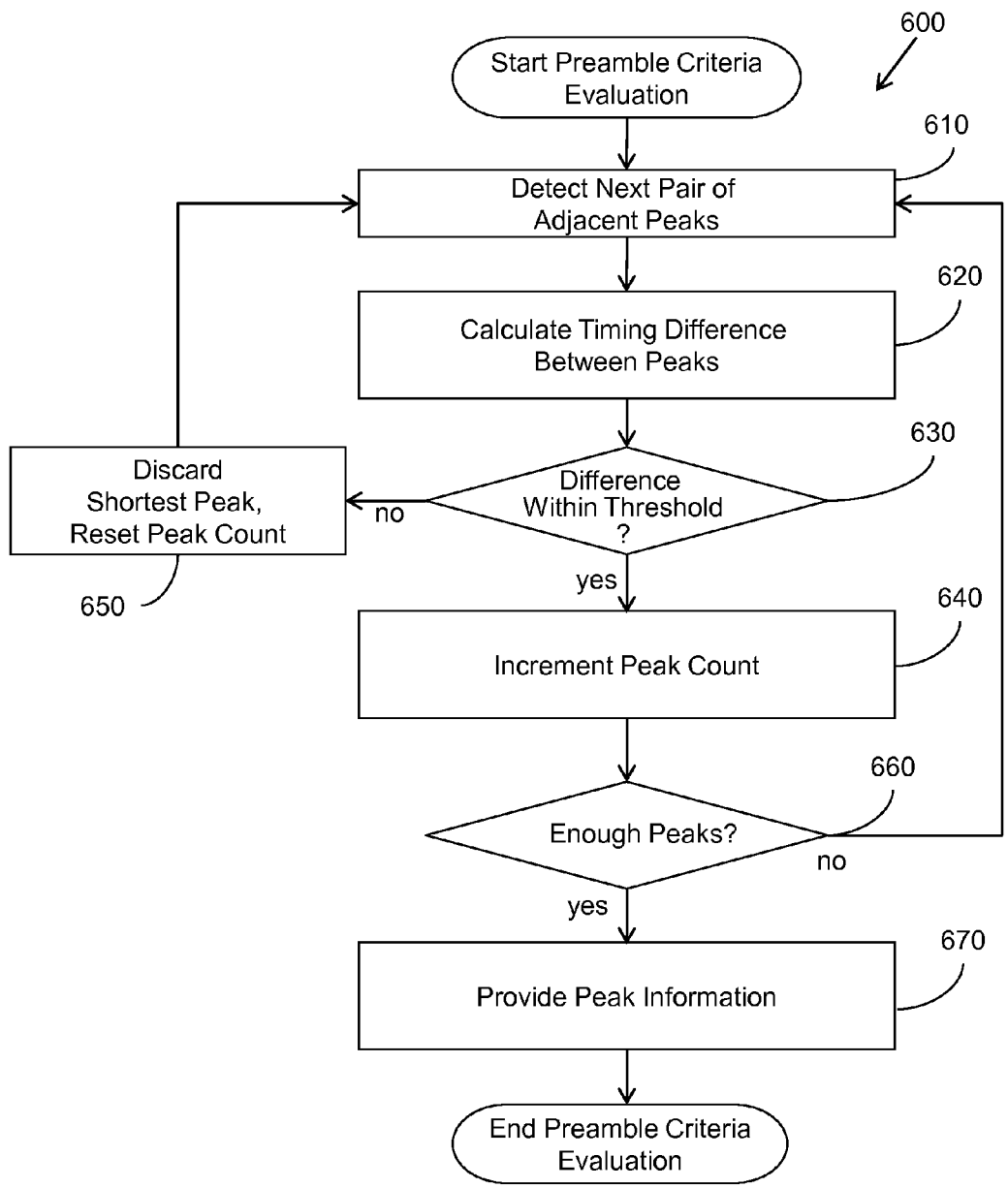
FIG. 6 illustrates one embodiment of a method associated with preamble detection based on repeated preamble codes.

FIG. 6 illustrates one embodiment of a preamble criteria evaluation method 600 that may be employed by the peak detection logic 240 (FIG. 5). At 610 the method detects a pair of adjacent peaks. The detection may be based on comparing the magnitude of the cross correlation average to a threshold value and detecting a peak when the magnitude exceeds the threshold. At 620, a timing difference between the two peaks is calculated corresponding to an amount of time that elapsed between occurrence of the peaks.

At 630, if the difference is a predetermined threshold range, the shortest peak in the pair of peaks is discarded at 650 and the method detects the next pair of adjacent peaks at 610 (including the taller of the peaks that was not discarded). The threshold range approximates the timing difference that is expected to occur between preamble codes based on the protocol in use. At 630, if the difference is within the predetermined threshold range, at 640 a peak count is incremented. At 660, if a number of peaks equivalent to the number of preamble codes in the preamble has been detected, it is determined that the entire preamble has been detected. At 670, the peak information (e.g., timing difference) between peaks is provided for calculation of a carrier frequency offset. In this manner, the method 600 reduces the likelihood of a false preamble detection by confirming the presence of a peak corresponding to each preamble code in the detected signal.

Figure 7:
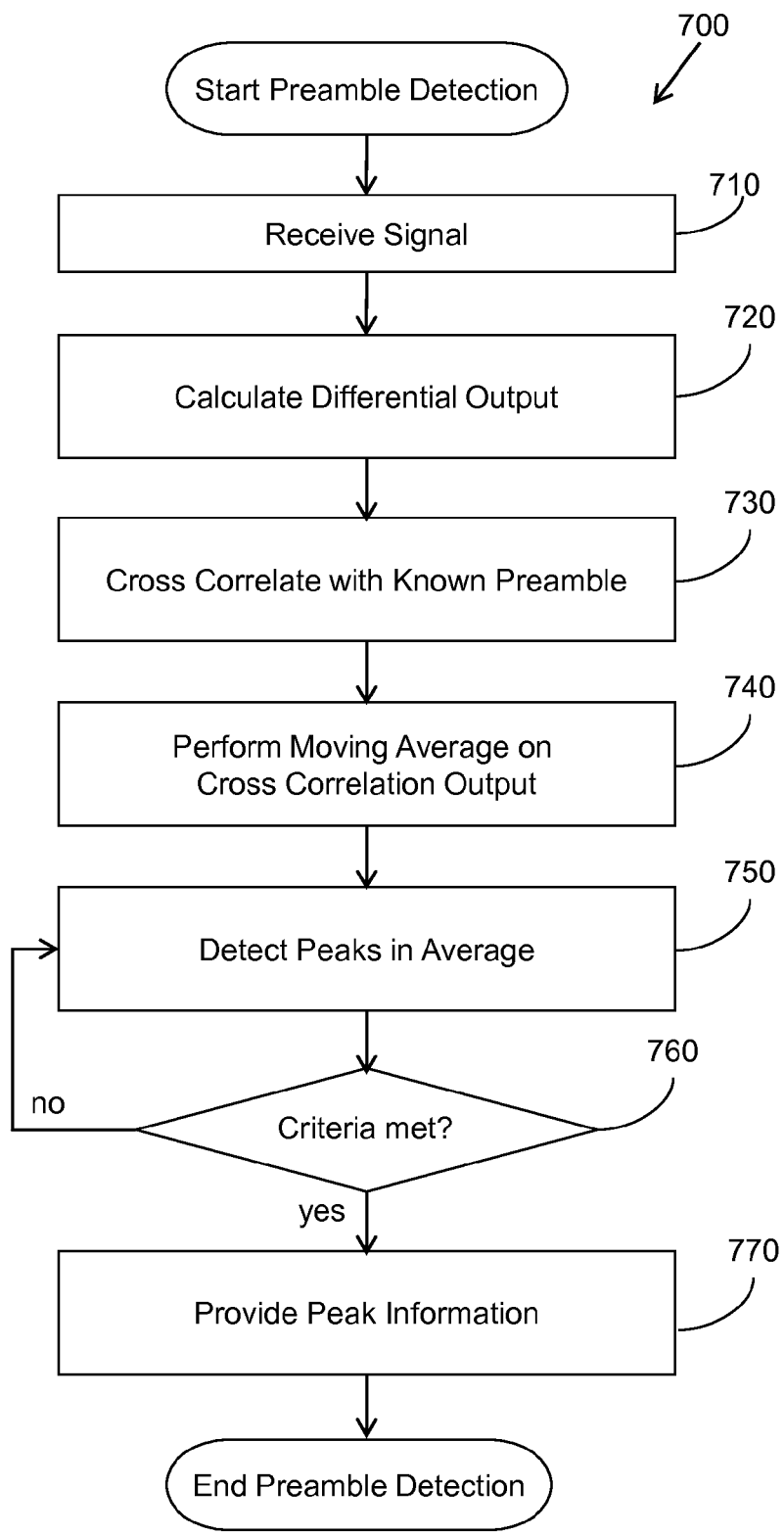
FIG. 7 illustrates one embodiment of a method associated with preamble detection based on repeated preamble codes.

FIG. 7 illustrates a method 700 associated with preamble detection based on repeated preamble codes. At 710, the method includes wirelessly receiving a signal. At 720, the method includes calculating a differential output corresponding to a multiplication of the signal and a delayed version of the signal. At 730, the method includes performing a cross correlation between the differential output and a known preamble pattern to produce a cross correlation output. At 740, the method includes performing a moving average calculation on the cross correlation output to produce an average cross correlation. At 750, the method includes detecting one or more peaks in the average cross correlation. A peak is detected when the average cross correlation that has an value greater than a threshold. When the one or more detected peaks meets predetermined preamble detection criteria, at 760 the method includes, at 770, providing information about at least one of the detected peaks for subsequent signal processing. At 660, if the one or more peaks do not meet the preamble detection criteria the method returns to 650 where the next peaks are detected.

The following includes definitions of selected terms employed herein. The definitions include various examples and/or forms of components that fall within the scope of a term and that may be used for implementation. The examples are not intended to be limiting. Both singular and plural forms of terms may be within the definitions.

References to "one embodiment", "an embodiment", "one example", "an example", and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in one embodiment" does not necessarily refer to the same embodiment, though it may.

"Logic", as used herein, includes but is not limited to hardware, firmware, instructions stored on a non-transitory medium or in execution on a machine, and/or combinations of each to perform a function(s) or an action(s), and/or to cause a function or action from another logic, method, and/or system. Logic may include a software controlled microprocessor, a discrete logic (e.g., ASIC), an analog circuit, a digital circuit, a programmed logic device, a memory device containing instructions, and so on. Logic may include one or more gates, combinations of gates, or other circuit components. Where multiple logics are described, it may be possible to incorporate the multiple logics into one physical logic. Similarly, where a single logic is described, it may be possible to distribute that single logic between multiple physical logics. One or more of the components and functions described herein may be implemented using one or more of the logic elements.

While for purposes of simplicity of explanation, illustrated methodologies are shown and described as a series of blocks. The methodologies are not limited by the order of the blocks as some blocks can occur in different orders and/or concurrently with other blocks from that shown and described. Moreover, less than all the illustrated blocks may be used to implement an example methodology. Blocks may be combined or separated into multiple components. Furthermore, additional and/or alternative methodologies can employ additional, not illustrated blocks.

To the extent that the term "includes" or "including" is employed in the detailed description or the claims, it is intended to be inclusive in a manner similar to the term "comprising" as that term is interpreted when employed as a transitional word in a claim.

While example systems, methods, and so on have been illustrated by describing examples, and while the examples have been described in considerable detail, it is not the intention of the applicants to restrict or in any way limit the scope of the appended claims to such detail. It is, of course, not possible to describe every conceivable combination of components or methodologies for purposes of describing the systems, methods, and so on described herein. Therefore, the disclosure is not limited to the specific details, the representative apparatus, and illustrative examples shown and described. Thus, this application is intended to embrace alterations, modifications, and variations that fall within the scope of the appended claims.

What is claimed is:

1. An apparatus, comprising:
   a differential computation logic configured to calculate a differential output corresponding to a multiplication of i) samples of a wirelessly received signal and ii) a delayed version of the samples;
   a preamble matching logic configured to perform a cross correlation between the differential output and a known preamble pattern to produce a cross correlation output;
   a cross correlation averaging logic configured to perform a moving average calculation on the cross correlation output to produce an average cross correlation;
   a peak detection logic configured to detect one or more peaks in the average cross correlation, wherein a peak is detected when the average cross correlation has an amplitude greater than a threshold; and
   wherein the peak detection logic is further configured to provide information about at least one of the detected peaks for subsequent processing when the one or more detected peaks meets predetermined criteria.

2. The apparatus of claim 1, wherein the differential computation logic is further configured to:
   input samples of the signal to a buffer that holds n samples, wherein n is selected to correspond to a predetermined delay;
   perform a conjugation operation on samples being output from the buffer to produce conjugated buffer output samples;
   cross correlate the samples of the signal with the conjugated buffer output samples; and
   provide the result of the cross correlating as the differential output.

3. The apparatus of claim 2, wherein the differential computation logic is further configured to reset the buffer to contain all zeroes if respective magnitudes of consecutive respective samples of the signal are greater than a threshold.

4. The apparatus of claim 1, wherein the preamble matching logic is configured to perform a cross correlation between the differential output and a complex differential of the known preamble pattern.

5. The apparatus of claim 1, wherein the cross correlation averaging logic is configured to store at least a portion of the cross correlation output in at least one buffer logically located in Static Random Access Memory (SRAM).

6. The apparatus of claim 1, wherein the peak detection logic is configured to:
   calculate a timing difference between adjacent detected peaks, wherein the timing difference comprises a time elapsing between occurrences of the adjacent peaks;
   compare the timing difference to a timing difference between adjacent preamble codes in a known preamble signal;
   when the results of the comparison exceeds a threshold, discard one of the adjacent detected peaks having a smaller amplitude than the other of the adjacent detected peaks; and
   reset a peak count to one.

7. The apparatus of claim 6, wherein the peak detection logic is configured to:
   increment the peak count when the results of the comparison does not exceed the threshold;
   until the peak count reaches a target peak number:
      calculate a timing difference between a next pair of adjacent detected peaks;
      compare the timing difference between the next pair of adjacent peaks to the timing difference between adjacent preamble codes;
      increment the peak count when the results of the comparison does not exceed the threshold; and
   determine that the predetermined criteria has been met when the peak count reaches a target peak number.

8. A method, comprising:
   wirelessly receiving a signal;
   calculating a differential output corresponding to a multiplication of the signal and a delayed version of the signal;
   performing a cross correlation between the differential output and a known preamble pattern to produce a cross correlation output;
   performing a moving average calculation on the cross correlation output to produce an average cross correlation;
   detecting one or more peaks in the average cross correlation, wherein a peak is detected when the average cross correlation has an amplitude greater than a threshold; and
   when the one or more detected peaks meets predetermined criteria, providing information about at least one of the detected peaks for subsequent signal processing.

9. The method of claim 8, wherein calculating the differential output comprises:
   inputting samples of the signal to a buffer that holds n samples, wherein n is selected to correspond to a predetermined delay;
   performing a conjugation operation on samples being output from the buffer to produce conjugated buffer output samples;
   cross correlating the samples of the signal with the conjugated buffer output samples; and
   providing the result of the cross correlating as the differential output.

10. The method of claim 9, wherein calculating the differential output further comprises resetting the buffer to contain all zeroes if respective magnitudes of respective samples of the signal are greater than a threshold.

11. The method of claim 8, where a producing a cross correlation output comprises performing cross correlation between the differential output and a complex differential of the known preamble pattern.

12. The method of claim 8, wherein performing a moving average calculation on the cross correlation output comprises storing at least a portion of the cross correlation output in at least one buffer logically located in Static Random Access Memory (SRAM).

13. The method of claim 8, further comprising:
calculating a timing difference between adjacent detected peaks, wherein the timing difference comprises a time elapsing between occurrences of the adjacent peaks;
comparing the timing difference to a timing difference between adjacent preamble codes in a known preamble signal;
when the results of the comparison exceeds a threshold, discarding one of the adjacent detected peaks having a smaller amplitude than the other of the adjacent detected peaks; and
resetting a peak count to one.

14. The method of claim 13, further comprising:
when the results of the comparison does not exceed the threshold, incrementing the peak count;
until the peak count reaches a target peak number:
calculating a timing difference between a next pair of adjacent detected peaks;
comparing the timing difference between the next pair of adjacent peaks to the timing difference between adjacent preamble codes;
when the results of the comparison does not exceed the threshold, incrementing the peak count; and
when the peak count reaches a target peak number, determining that the predetermined criteria has been met.

15. A system-on-chip, comprising:
a receiver configured to wirelessly receive a signal;
a preamble detector logic configured to:
calculate a differential output corresponding to a multiplication of the signal and a delayed version of the signal;
perform cross correlation between the differential output and a known preamble pattern to produce a cross correlation output;
perform a moving average calculation on the cross correlation output to produce an average cross correlation;
detect one or more peaks in the average cross correlation, wherein a peak is detected when the average cross correlation has an amplitude greater than a threshold; and
when the one or more detected peaks meets predetermined criteria, provide peak information describing one or more aspects of the one or more detected peaks; and
a carrier frequency offset calculation logic configured to calculate a carrier frequency offset based, at least in part, on the peak information.

16. The system-on-chip of claim 15, wherein the preamble detection logic is configured to calculate the differential output by:
inputting samples of the signal to a buffer that holds n samples, wherein n is selected to correspond to a predetermined delay;
performing a conjugation operation on samples being output from the buffer to produce conjugated buffer output samples;
cross correlating the samples of the signal with the conjugated buffer output samples; and
providing the result of the cross correlating as the differential output.

17. The system-on-chip of claim 16, wherein the preamble detection logic is configured to reset the buffer to contain all zeroes if respective magnitudes of respective samples of the signal are greater than a threshold.

18. The system-on-chip of claim 15, wherein the preamble detection logic is configured to store at least a portion of the cross correlation output in at least one buffer logically located in Static Random Access Memory (SRAM).

19. The system-on-chip of claim 15, wherein the preamble detection logic is configured to:
calculate a timing difference between adjacent detected peaks, wherein the timing difference comprises a time elapsing between occurrences of the adjacent peaks;
compare the timing difference to a timing difference between adjacent preamble codes in a known preamble signal;
when the results of the comparison exceeds a threshold, discard one of the adjacent detected peaks having a smaller amplitude than the other of the adjacent detected peaks; and
reset a peak count to one.

20. The system-on-chip of claim 19, wherein the preamble detection logic is configured to:
when the results of the comparison does not exceed the threshold, increment the peak count;
until the peak count reaches a target peak number:
calculate a timing difference between a next pair of adjacent detected peaks;
compare the timing difference between the next pair of adjacent peaks to the timing difference between adjacent preamble codes;
when the results of the comparison does not exceed the threshold, increment the peak count; and
when the peak count reaches a target peak number, determine that the predetermined criteria has been met.

* * * * *